(12) United States Patent
Hou et al.

(10) Patent No.: US 11,458,438 B2
(45) Date of Patent: Oct. 4, 2022

(54) POLYURETHANE/POLYVINYLIDENE FLUORIDE COMPOSITE MEMBRANE FOR EXTRACTING ORGANIC SULFIDE FROM NAPHTHA AND PREPARATION METHOD THEREFOR

(71) Applicant: CHINA UNIVERSITY OF PETROLEUM(EAST CHINA), Qingdao (CN)

(72) Inventors: Yingfei Hou, Qingdao (CN); Yang Xu, Qingdao (CN); Mumin Wang, Qingdao (CN); Congcong Chen, Qingdao (CN); Yiyu Li, Qingdao (CN); Qingshan Niu, Qingdao (CN)

(73) Assignee: CHINA UNIVERSITY OF PETROLEUM(EAST CHINA), Qingdao (CN)

( * ) Notice: Subject to any disclaimer, the term of this patent is extended or adjusted under 35 U.S.C. 154(b) by 0 days.

(21) Appl. No.: 17/280,126

(22) PCT Filed: Dec. 31, 2018

(86) PCT No.: PCT/CN2018/125985
§ 371 (c)(1),
(2) Date: Mar. 25, 2021

(87) PCT Pub. No.: WO2020/087761
PCT Pub. Date: May 7, 2020

(65) Prior Publication Data
US 2021/0308626 A1 Oct. 7, 2021

(30) Foreign Application Priority Data
Oct. 31, 2018 (CN) .......................... 201811283211.5

(51) Int. Cl.
*B01D 67/00* (2006.01)
*B01D 69/10* (2006.01)
*B01D 69/12* (2006.01)
*B01D 71/58* (2006.01)

(52) U.S. Cl.
CPC ...... *B01D 67/0013* (2013.01); *B01D 67/0011* (2013.01); *B01D 69/10* (2013.01); *B01D 69/12* (2013.01); *B01D 71/58* (2013.01); *B01D 2325/04* (2013.01); *B01D 2325/24* (2013.01)

(58) Field of Classification Search
CPC .... B01D 69/02; B01D 71/34; B01D 2323/08; B01D 67/0009; B01D 69/06; B01D 67/0011; B01D 67/0013; B01D 69/10; B01D 69/12; B01D 71/58; B01D 2325/04; B01D 2325/24; B01D 61/145; B01D 71/54; B01D 71/52; B01D 67/0002; C10G 31/11; C10G 2300/202
See application file for complete search history.

(56) References Cited

U.S. PATENT DOCUMENTS

| | | | | |
|---|---|---|---|---|
| 6,146,747 A * | 11/2000 | Wang | .................. | B01D 39/083 210/490 |
| 10,252,224 B2 * | 4/2019 | Xiao | .................... | B01D 69/081 |
| 2006/0234582 A1 * | 10/2006 | Gohl | ...................... | B01D 69/02 442/194 |
| 2010/0166961 A1 * | 7/2010 | Beard | .................... | B01D 71/30 427/256 |
| 2018/0126338 A1 * | 5/2018 | Weber | .................... | C08G 18/61 |
| 2021/0070989 A1 * | 3/2021 | Al-Rashid | .......... | A61B 5/14735 |

FOREIGN PATENT DOCUMENTS

| | | | |
|---|---|---|---|
| CN | 103752182 A | 4/2014 | |
| CN | 10660693 A * | 5/2017 | ............. B01D 61/36 |
| CN | 108211823 A | 6/2018 | |

OTHER PUBLICATIONS

International Search Report issued in corresponding International Application No. PCT/CN2018/125985; dated Jul. 26, 2019; State Intellectual Property Office of the P.R. China, Beijing, China, 8 pgs.
Written Opinion issued in corresponding International Application No. PCT/CN2018/125985; dated Jul. 26, 2019; State Intellectual Property Office of the P.R. China, Beijing, China, 7 pgs.
Hou et al., "Preparation and Performance of Thermoplastic Polyurethane Pervaporation Membrane for Gasoline Desulfurization", Journal of Chemical Engineering of Chinese Universities, vol. 32, No. 3, 8 pgs., Jun. 30, 2018.
First Office Action issued in corresponding Chinese Application No. 201811283211.5; dated Aug. 9, 2019; State Intellectual Property Office of the P.R. China, Beijing, China, 16 pgs.
Second Office Action issued in corresponding Chinese Application No. 201811283211.5; dated Dec. 12, 2019; State Intellectual Property Office of the P.R. China, Beijing, China, 15 pgs.
First Search Report issued in corresponding Chinese Application No. 201811283211.5; dated Aug. 1, 2019; State Intellectual Property Office of the P.R. China, Beijing, China, 3 pgs.

(Continued)

*Primary Examiner* — Hayden Brewster
(74) *Attorney, Agent, or Firm* — Hauptman Ham, LLP

(57) ABSTRACT

The present invention relates to the field of composite membrane and discloses a polyurethane/polyvinylidene fluoride composite membrane for extracting organic sulfide from naphtha. The polyurethane/polyvinylidene fluoride composite membrane includes an active layer and a support layer where the active layer is a polyurethane casting membrane and the support layer is a polyvinylidene fluoride membrane. The polyurethane/polyvinylidene fluoride composite membrane is prepared by coating the active layer onto the support layer. At the same time, a preparation method for the polyurethane/polyvinylidene fluoride composite membrane is disclosed. The present invention has the following beneficial effects: the polyurethane/polyvinylidene fluoride composite membrane prepared in the present invention may be used to extract organic sulfide in naphtha with high separation efficiency. Further, the composite membrane almost does not change the octane number and the like of the raw material oil, thereby improving the extraction rate of the organic sulfide.

2 Claims, No Drawings

(56) References Cited

OTHER PUBLICATIONS

Added to Retrieve Search issued in corresponding Chinese Application No. 201811283211.5; dated Mar. 17, 2020; State Intellectual Property Office of the P.R. China, Beijing, China, 3 pgs.

Notification to Grant Patent Right for Invention issued in corresponding Chinese Application No. 201811283211.5; dated Apr. 2, 2020; State Intellectual Property Office of the P.R. China, Beijing, China, 5 pgs.

* cited by examiner

POLYURETHANE/POLYVINYLIDENE FLUORIDE COMPOSITE MEMBRANE FOR EXTRACTING ORGANIC SULFIDE FROM NAPHTHA AND PREPARATION METHOD THEREFOR

RELATED APPLICATIONS

The present application is a U.S. National Phase of International Application Number PCT/CN2018/125985, filed Dec. 31, 2018, and claims the priority of Chinese Application No. 201811283211.5, filed Oct. 31, 2018.

TECHNICAL FIELD

The present invention relates to the field of composite membrane, and in particular to polyurethane/polyvinylidene fluoride composite membrane for extracting organic sulfide from naphtha and a preparation method therefor.

BACKGROUND

Nowadays, with increasing environmental concerns, production of clean oils has become a world-wide important topic. Sulfide contained in naphtha exists in the form of elemental sulfur, hydrogen sulfide, thiol, thioether and thiophene and the like, and organic sulfide is an important component therein. The traditional treatment process is hydrodesulfurization which is high in cost and strict in operation conditions. The organic sulfide is changed into hydrogen sulfide after being treated with hydrogenation, and can be recycled and discharged only after going through a complex tail gas treatment process, resulting in huge wastes.

Along with development and application of membrane separation technology, more and more membrane separation processes are applied to the actual chemical production processes. Pervaporation technique draws the attention of researchers in different countries due to its environment friendliness, good economy, ease of scaling up and so on. Organic sulfide in oils can be easily extracted by this technique. The technique does not require pretreatment of raw materials, and will not cause any chemical reaction, thus avoiding generation of hydrogen sulfide. Based on this technique, the sulfide content in the oils can be reduced and the organic sulfide such as extracted thiophene may also be used as an important raw material for manufacture of chemical products such as pharmaceuticals, pesticides and dyes after going through a simple purification process. Therefore, it has good environmental benefits and economic values.

Polyurethane has properties of strong chemical stability, strong solvent resistance, strong hydrophobicity and good organophilicity and the like and thus is an ideal material for manufacture of membranes. When the membrane is directly used to extract a sulfur-containing organic compound from naphtha, it has a low permeation flux which affects the extraction rate of the sulfur-containing organic compound.

SUMMARY

In order to solve the above technical problem, the present invention provides a polyurethane/polyvinylidene fluoride composite membrane for extracting organic sulfide from naphtha and a preparation method therefor.

In order to achieve the above purpose, the present invention employs the following technical scheme.

A polyurethane/polyvinylidene fluoride composite membrane for extracting organic sulfide from naphtha includes an active layer and a support layer, where the active layer is polyurethane casting membrane, the support layer is a polyvinylidene fluoride membrane, and the polyurethane/polyvinylidene fluoride composite membrane is prepared by coating the active layer onto the support layer.

Furthermore, the active layer has a thickness of 20-30 µm and the support layer has a thickness of 110-120 µm.

A preparation method for the polyurethane/polyvinylidene fluoride composite membrane for extracting organic sulfide from naphtha includes the following steps:

(1) Preparation of the Support Layer adding polyvinylidene fluoride, polyethylene glycol, and N-Methyl pyrrolidone into a round-bottom flask at a given mass ratio, placing the round-bottom flash in a thermostatic water bath of 50-60° C. and holding for 12-24 h until complete dissolution, and then performing filtration, degassing, film wiping and drying in sequence;

placing the wiped film into de-ionized water and holding for 48-72 h to remove N-Methyl pyrrolidone, and then placing into an air-blowing drying oven for drying with a temperature controlled to 50-60° C. to obtain the polyvinylidene fluoride membrane as the support layer;

(2) Preparation of the Coating Solution of Active Layer a. adding polyurethane, polyethylene glycol, and tetrahydrofuran into a round-bottom flask at a given mass ratio and waiting until complete dissolution so as to form a homogeneous casting solution;

b. performing filtration for the homogeneous casting solution obtained at step a by using a stainless steel strainer with 300 meshes;

c. standing the casting solution filtered at step b for 2-5 h to remove bubbles so as to obtain the polyurethane casting solution as the active layer;

(3) Preparation of Composite Membrane coating, by a knife, the casting solution de-bubbled at step (2) onto the polyvinylidene fluoride membrane obtained at step (1), and then placing the polyvinylidene fluoride membrane into the air-blowing drying oven to remove tetrahydrofuran in the active layer so as to obtain the polyurethane/polyvinylidene fluoride composite membrane.

Further, at step (1), a mass ratio of polyvinylidene fluoride, polyethylene glycol, and N-Methyl pyrrolidone is 1:0.1-0.2:5-8.

Further, at step (1), a thickness of the knife is adjusted to 100-200 µm when film wiping is performed on a non-woven fabric.

Further, the polyvinylidene fluoride membrane prepared at step (1) has a thickness of 110-120 µm.

Further, at step (2), the mass ratio of polyurethane, tetrahydrofuran and polyethylene glycol is 2:0.1-0.2:12.

Further, at step (3), the thickness of the knife is adjusted to 200-300 µm during film wiping, and the temperature of the air-blowing drying oven is controlled to 410-50° C. during drying.

Further, an average molecular weight of polyethylene glycol at steps (1) and (2) is 200.

The present invention has the following beneficial effects: the composite membrane uses the polyvinylidene fluoride ultra-filtration membrane as the support layer because polyvinylidene fluoride has strong mechanical performance and is a good supporting body for a pervaporation membrane. The composite membrane uses polyurethane as the active layer because polyurethane has strong affinity to organic sulfide in naphtha as well as the advantages of good solvent resistance and good flexibility and so on according to the dissolution-diffusion theory.

When the polyurethane/polyvinylidene fluoride composite membrane prepared in the prevent invention is used to extract organic sulfide from naphtha, the composite membrane has the following advantages:

1. The prepared composite membrane has a high separation efficiency and is capable of extracting no less than 80% of organic sulfide in naphtha.

2. The device is simple, and easy to operate under mild conditions.

3. The octane number and the like of the raw material oil are basically unchanged.

In conclusion, the polyurethane/polyvinylidene fluoride composite membrane prepared in the prevent invention may be used to extract organic sulfide in naphtha so as to greatly improve the extraction rate of the organic sulfide.

DETAILED DESCRIPTION OF THE EMBODIMENTS

The technical scheme of the embodiments of the present invention is described clearly and fully below. It is apparent that the embodiments described herein are merely some of the embodiments of the present invention rather than all the embodiments. All other embodiments obtained by those skilled in the art without paying creative work shall all fall within the scope of protection f the present invention.

Embodiment 1

1. 45.883 g of polyvinylidene fluoride, 7.058 g of polyethylene glycol and 300 g of N-Methyl pyrrolidone of which a mass ratio was 1:0.15:6.54 were added into a round-bottom flask and stirred for 12 h in a water bath of 50° C. until complete dissolution, and then filtration and de-bubbling were performed, a knife thickness of a film wiping machine was adjusted to 100 μm to perform film wiping on a non-woven fabric, the wiped film was then immersed into de-ionized water for 72 h, and then placed into a drying oven of 60° C. for drying so as to obtain a polyvinylidene fluoride membrane of 110-120 μm, i.e. a support layer.

2. 2 g of polyurethane, 0.1 g of polyethylene glycol and 12 g of tetrahydrofuran of which a mass ratio was 2:0.1:12 were added into a conical flask and dissolved at room temperature to obtain a casting solution;

the prepared casting solution was filtered by a copper screen with 300 meshes and then stood for 2 h to remove bubbles so as to obtain a polyurethane casting solution as an active layer.

3. The knife thickness was adjusted to 300 μm, the casting solution obtained at step 2 was coated onto the polyvinylidene fluoride support layer obtained at step 1, and the obtained membrane was placed into an air-blowing drying oven of 40° C. to remove tetrahydrofuran so as to obtain a polyurethane/polyvinylidene fluoride composite membrane.

Embodiment 2

1, 50.285 g of polyvinylidene fluoride, 5.145 g of polyethylene glycol and 300 g of N-Methyl pyrrolidone of which a mass ratio was 1:0.1:5.97 were added into a round-bottom flask and stirred for 12 h in a water bath of 50° C. until complete dissolution, and then filtration and de-bubbling were performed, a knife thickness of a film wiping machine was adjusted to 100 μm to perform film wiping on a non-woven fabric, the wiped film was then immersed into de-ionized water for 72 h, and then placed into a drying oven of 60° C. for drying so as to obtain a polyvinylidene fluoride membrane of 110-120 μm, i.e. a support layer.

2. 2 g of polyurethane, 0.15 g of polyethylene glycol and 12 g of tetrahydrofuran of which a mass ratio was 2:0.15:12 were added into a conical flask and dissolved at room temperature to obtain a casting solution;

the prepared casting solution was filtered by a copper screen with 300 meshes and then stood for 2 h to remove bubbles so as to obtain a polyurethane casting solution as an active layer.

3. The knife thickness was adjusted to 250 μm, the casting solution obtained at step 2 was coated onto the polyvinylidene fluoride support layer obtained at step 1, and the obtained membrane was placed into an air-blowing drying oven of 40° C. to remove tetrahydrofuran so as to obtain a polyurethane/polyvinylidene fluoride composite membrane.

Embodiment 3

1. 47.241 g of polyvinylidene fluoride, 9.365 g of polyethylene glycol and 350 g of N-Methyl pyrrolidone of which a mass ratio was 1:0.2:7.41 were added into a round-bottom flask and stirred for 12 h in a water bath of 50° C. until complete dissolution, and then filtration and de-bubbling were performed, a knife thickness of a film wiping machine was adjusted to 100 μm to perform film wiping on a non-woven fabric, the wiped film was then immersed into de-ionized water for 72 h, and then placed into a drying oven of 60° C. for drying so as to obtain a polyvinylidene fluoride membrane of 110-120 μm, i.e. a support layer.

2. 2 g of polyurethane, 0.2 g of polyethylene glycol and 12 g of tetrahydrofuran of which a mass ratio was 2:0.2:12 were added into a conical flask and dissolved at room temperature to obtain a casting solution;

the prepared casting solution was filtered by a copper screen with 300 meshes and then stood for 2 h to remove bubbles so as to obtain a polyurethane casting solution as an active layer.

3. The knife thickness was adjusted to 200 μm, the casting solution obtained at step 2 was coated onto the polyvinylidene fluoride support layer obtained at step 1, and the obtained membrane was placed into an air-blowing drying oven of 40° C. to remove tetrahydrofuran so as to obtain a polyurethane/polyvinylidene fluoride composite membrane.

1. Naphtha was Treated with the Polyurethane/Polyvinylidene Fluoride composite Membrane The polyurethane/polyvinylidene fluoride composite membranes prepared in the embodiments 1, 2 and 3 were used to perform an extraction test for organic sulfide in naphtha. The data of permeation flux and sulfur content in enriched liquid were obtained by treating different sulfur contents in naphtha using the three polyurethane/polyvinylidene fluoride composite membranes. The specific test results were shown in Table 1.

TABLE 1

| Embodiment | Sulfur content in naphtha mg/L | Feed flowrate mL/min | Permeation flux $kg \cdot m^{-2} \cdot h^{-1}$ | Sulfur content in enriched liquid mg/L |
|---|---|---|---|---|
| Embodiment 1 | 1300 | 90 | 1.25 | 4000 |
|  | 2300 | 90 | 1.27 | 6000 |
|  | 6200 | 90 | 1.00 | 18000 |

TABLE 1-continued

| Embodiment | Sulfur content in naphtha mg/L | Feed flowrate mL/min | Permeation flux kg·m$^{-2}$·h$^{-1}$ | Sulfur content in enriched liquid mg/L |
|---|---|---|---|---|
| Embodiment 2 | 1300 | 100 | 1.29 | 3900 |
|  | 2300 | 100 | 1.36 | 6000 |
|  | 6200 | 100 | 1.25 | 18000 |
| Embodiment 3 | 1300 | 110 | 1.32 | 4000 |
|  | 2300 | 110 | 1.34 | 5500 |
|  | 6200 | 110 | 1.30 | 17500 |

The results show that under the test conditions, the permeation fluxes of the composite membranes prepared in the three embodiments can all reach 1-2 kg·m$^{-2}$·h$^{-1}$ or higher and the sulfur enrichment factors (sulfur content in enriched liquid/sulfur content in naphtha) are all around 3.00. Therefore, the membranes have good extraction effect on sulfide.

2. Life of the Polyurethane/Polyvinylidene Fluoride Composite Membrane

Further, life test was performed for the polyurethane/polyvinylidene fluoride composite membranes prepared in the embodiments 1, 2 and 3. With the sulfur content in naphtha being 1300 mg/L and the feed flow rate being 90 mL/min, the test was run continuously for 100 h and then the test data obtained were shown in Table 2 below.

TABLE 2

| Embodiment | Permeation flux kg·m$^{-2}$·h$^{-1}$ | Mean flux kg·m$^{-2}$·h$^{-1}$ | Sulfur enrichment factor | Mean enrichment factor |
|---|---|---|---|---|
| Embodiment 1 | ≥1.00 | 1.03 | ≥3.00 | 3.29 |
| Embodiment 2 | ≥1.00 | 1.12 | ≥3.00 | 3.13 |
| Embodiment 3 | ≥1.00 | 1.15 | ≥3.00 | 3.04 |

The test results show that under the test conditions, the permeation fluxes are all at or above 1.00 kg·m$^{-2}$·h$^{-1}$, and the sulfur enrichment factors are all maintained at or above 3.00.

In the present invention, a spacing of molecular chains of polyurethane can be increased by adding polyethylene glycol to polyurethane. Polyethylene glycol also has good affinity to organic sulfide. Fewer sulfur enrichment factors will be lost while the permeation flux is increased. Thus, a trade-off effect of the permeation flux and the enrichment factor that is encountered frequently at the time of modification of the pervaporation membrane can be avoided, thereby significantly improving the extraction rate of the sulfur-containing organic compound from naphtha.

Of course, the foregoing descriptions are not limiting of the present invention and the present invention is not limited to the above embodiments. Any change, modification, addition or substitution made by those skilled in the art within the essence scope of the present invention shall all fall within the scope of protection of the present invention.

The invention claimed is:

1. A preparation method for a polyurethane/polyvinylidene fluoride composite membrane, comprising an active layer and a support layer, wherein the active layer is a polyurethane casting membrane, the support layer is a polyvinylidene fluoride membrane, and the polyurethane/polyvinylidene fluoride composite membrane is prepared by coating the active layer onto the support layer, and the active layer has a thickness of 20-30 µm and the support layer has a thickness of 110-120 µm, the preparation method comprising the following steps:

(1) preparation of the support layer by
   a. adding polyvinylidene fluoride, polyethylene glycol, and N-Methyl pyrrolidone into a round-bottom flask at a first mass ratio, placing the round-bottom flask in a thermostatic water bath of 50-60° C. and holding for 12-24 hours until the added polyvinylidene fluoride, polyethylene glycol, and N-Methyl pyrrolidone are completely dissolved, and then performing filtration, degassing, film wiping and drying in sequence;
   b. placing the wiped film into de-ionized water and holding for 48-72 hours to remove N-Methyl pyrrolidone, and then placing into an air-blowing drying oven for drying with a temperature controlled to 50-60° C. to obtain the polyvinylidene fluoride membrane as the support layer;
the first mass ratio of polyvinylidene fluoride, polyethylene glycol, and N-Methyl pyrrolidone is 1:0.1-0.2:5-8;
a thickness of a knife is 100-200 µm when film wiping is performed on a non-woven fabric;

(2) preparation of coating solution of the active layer by
   a. adding polyurethane, polyethylene glycol, and tetrahydrofuran into a round-bottom flask at a second mass ratio and waiting until the added polyurethane, polyethylene glycol, and tetrahydrofuran are completely dissolved so as to form a homogeneous casting solution;
   b. performing filtration for the homogeneous casting solution obtained at step a by using a stainless steel strainer with 300 meshes;
   c. standing the casting solution filtered at step b for 2-5 hours to remove bubbles so as to obtain the polyurethane casting solution as the active layer;

(3) preparation of the composite membrane by
   a. coating, by the knife, the casting solution de-bubbled at step (2) onto the polyvinylidene fluoride membrane obtained at step (1), and then placing the polyvinylidene fluoride membrane into the air-blowing drying oven to remove tetrahydrofuran in the active layer so as to obtain the polyurethane/polyvinylidene fluoride composite membrane;

at step (2), the second mass ratio of polyurethane, tetrahydrofuran and polyethylene glycol is 2:0.1-0.2:12, wherein an average molecular weight of polyethylene glycol at steps (2) is 200;

at step (3), the thickness of the knife is 200-300 µm during film wiping, and the temperature of the air-blowing drying oven is controlled to 40-50° C. during drying.

2. The preparation method for the polyurethane/polyvinylidene fluoride composite membrane according to claim 1, wherein an average molecular weight of polyethylene glycol at step (1) is 200.

* * * * *